(12) United States Patent
Curd et al.

(10) Patent No.: US 11,272,288 B1
(45) Date of Patent: Mar. 8, 2022

(54) SYSTEM AND METHOD FOR SELECTIVE ACTIVATION OF AN AUDIO REPRODUCTION DEVICE

(71) Applicant: SCAEVA TECHNOLOGIES, Gilroy, CA (US)

(72) Inventors: Steven Elliott Curd, Gilroy, CA (US); Wendy Susan Curd, Gilroy, CA (US)

(73) Assignee: Scaeva Technologies, Inc., Gilroy, CA (US)

( * ) Notice: Subject to any disclaimer, the term of this patent is extended or adjusted under 35 U.S.C. 154(b) by 0 days.

(21) Appl. No.: 16/516,023

(22) Filed: Jul. 18, 2019

Related U.S. Application Data

(60) Provisional application No. 62/700,913, filed on Jul. 19, 2018.

(51) Int. Cl.
| | | |
|---|---|---|
| *H04R 5/04* | (2006.01) | |
| *G06F 3/01* | (2006.01) | |
| *H04R 1/10* | (2006.01) | |
| *H04L 29/06* | (2006.01) | |
| *H04R 5/033* | (2006.01) | |
| *H04L 65/60* | (2022.01) | |

(52) U.S. Cl.
CPC ............... *H04R 5/04* (2013.01); *G06F 3/015* (2013.01); *H04L 65/601* (2013.01); *H04R 1/1008* (2013.01); *H04R 5/033* (2013.01); *G06F 2203/011* (2013.01)

(58) Field of Classification Search
None
See application file for complete search history.

(56) References Cited

U.S. PATENT DOCUMENTS

| | | | | |
|---|---|---|---|---|
| 2009/0214060 A1* | 8/2009 | Chuang | ................ | A61B 5/6814 381/151 |
| 2010/0041962 A1* | 2/2010 | Causevic | ............. | A61B 5/0006 600/301 |
| 2011/0081037 A1* | 4/2011 | Oh | ..................... | A61B 5/02438 381/380 |
| 2014/0223462 A1* | 8/2014 | Aimone | ................. | G16H 40/67 725/10 |
| 2015/0296061 A1* | 10/2015 | Geiger | ..................... | G06F 3/167 348/14.12 |
| 2015/0358733 A1* | 12/2015 | Chukka | ................... | H04L 65/60 381/74 |
| 2016/0210752 A1* | 7/2016 | Ratcliff | ................. | G09G 5/026 |
| 2016/0292271 A1* | 10/2016 | Kim | ................... | G06F 16/9535 |
| 2016/0366507 A1* | 12/2016 | Hou | ..................... | H04R 1/1041 |
| 2017/0041711 A1* | 2/2017 | Inakoshi | ............. | H04R 1/1091 |
| 2017/0094411 A1* | 3/2017 | Peterson | .................. | H04R 5/04 |
| 2017/0142244 A1* | 5/2017 | Jeong | .................... | H04W 4/90 |
| 2017/0325738 A1* | 11/2017 | Antos | ................. | A61B 5/6803 |

(Continued)

*Primary Examiner* — Qin Zhu
(74) *Attorney, Agent, or Firm* — Raghunath S. Minisandram

(57) ABSTRACT

A system and method to selectively activate an audio reproduction device is disclosed. An audio reproduction device is provided. The audio reproduction device is coupled to an audio source to receive audio signal. A biosensor is provided to sense biosignal of a listener. Sensed biosignal is processed by a biosignal processor. The processed biosignal is evaluated by an intermediate digital processor. Based on the evaluation, the audio reproduction device is selectively enabled to reproduce the received audio signal.

20 Claims, 12 Drawing Sheets

(56) References Cited

U.S. PATENT DOCUMENTS

| | | | | |
|---|---|---|---|---|
| 2017/0339484 A1* | 11/2017 | Kim | .................... | A61B 5/0478 |
| 2019/0297408 A1* | 9/2019 | Mohammadi | ........ | H04R 1/1041 |
| 2019/0310707 A1* | 10/2019 | Hwang | ................ | H04R 1/1041 |
| 2020/0280789 A1* | 9/2020 | Schrader | ............... | A61B 5/6816 |
| 2020/0373001 A1* | 11/2020 | Harrison | .................. | A61B 5/38 |

* cited by examiner

| BRAIN WAVE TYPE | FREQUENCY SPECTRUM (HZ) | AMPLITUDE (µv) |
|---|---|---|
| DELTA | 0.1-0.3 | 100-200 |
| THETA | 4.0-7.5 | <30 |
| ALPHA | 8.0-12.0 | 30-50 |
| BETA | 13.0-30.0 | <20 |
| GAMMA | 30.0-50.0 | <10 |

FIGURE 2A

SYSTEM AND METHOD FOR SELECTIVE ACTIVATION OF AN AUDIO REPRODUCTION DEVICE

RELATED APPLICATION

This application claims priority to provisional patent application 62/700,913 entitled "SYSTEM AND METHOD FOR SELECTIVE ACTIVATION OF AN AUDIO REPRODUCTION DEVICE" filed on Jul. 19, 2018, which is incorporated herein by reference, in its entirety.

TECHNICAL FIELD

The present invention relates generally to audio reproduction device, and more specifically, audio reproduction devices with sensors.

DESCRIPTION OF RELATED ART

In a recording studio environment, an audio reproduction device that is open to the environment (and not enclosed) may bleed sound that may corrupt the recording of audio signals. In other examples, if the audio reproduction device is removed from a listener's head, it may be beneficial to selectively turn off the audio reproduction device.

With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method for selectively activating an audio reproduction device is disclosed. the method includes, providing the audio reproduction device. The audio reproduction device is coupled to an audio source to receive audio signal. A biosensor is provided to sense biosignal of a listener. Sensed biosignal is processed by a biosignal processor. The processed biosignal is evaluated by an intermediate digital processor. Based on the evaluation, the audio reproduction device is selectively enabled to reproduce the received audio signal.

In another embodiment, a system to selectively activate an audio reproduction device is disclosed. The system includes an audio source, the audio reproduction device is coupled to the audio source. A biosensor to sense biosignal of a listener is provided. A biosignal processor is configured to process the sensed biosignal. An intermediate digital processor configured to evaluate the processed biosignal. Based on the evaluation, the audio reproduction device is selectively enabled to reproduce the received audio signal to the listener.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following figures:

FIG. 2A shows an example table describing various brainwave signal frequencies, according to one aspect of the present disclosure;

DETAILED DESCRIPTION

To facilitate an understanding of the adaptive aspects of the present disclosure, an example encryption system will be described. The specific construction and operation of the adaptive aspects of various elements of the example encryption system will be further described with reference to the encryption system.

Figure 1:
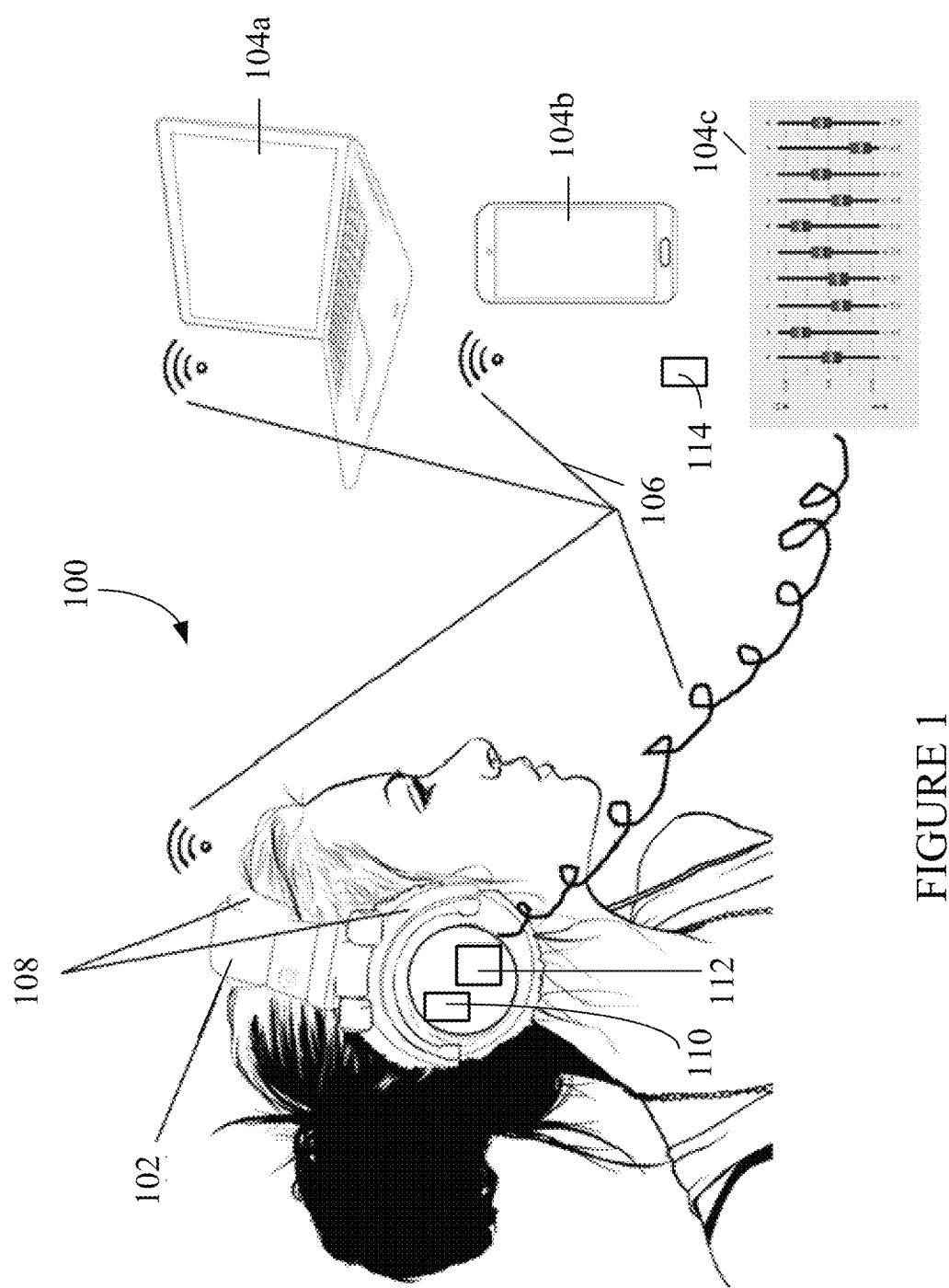
FIG. 1 shows an example system with an audio reproduction device, according to one aspect of the present disclosure.

FIG. 1 shows an example system 100 of the current disclosure. The system 100 includes an audio reproduction device 102. One or more audio source 104a-104c may be coupled to the audio reproduction device 102 over link 106. One or more biosensors 108 are selectively disposed near or over the human utilizing the audio reproduction device 102. The system 100 further includes a biosensor processor 110 and an intermediate digital processor 112. In some examples, the system 100 may further include a results processor 114.

The audio reproduction device 102 may be headphones or earbuds with a transducer capable of receiving electrical signals indicative of an audio signal and reproducing corresponding audio waves from the audio signal. The audio reproduction device 102 may be placed in, on or around the ear(s) of a human being.

The audio source 104a-104c may be a source of audio media, and potentially visual media. For example, the audio source 104a-104c may be a computer device, smart phone, digital audio player, sound mixing board, or headphone amplifier. In some examples, the audio and/or video media may be encrypted, or obfuscated in such a way that the media may not be consumed without decryption or de-obfuscation.

The link 106 linking the audio source 104a-104c to the audio reproduction device 102 may be a wired link or a wireless link, carrying signals to and from the headphone device.

One or more biosensors 108 are selectively disposed near or over the human utilizing the audio reproduction device 102. In some examples, the biosensor 108 may be touching the skin of the human utilizing the audio reproduction device and configured to sense biosignals of the human. In some examples, the biosensor 108 may be nearby the skin of the human and configured to sense the biosignals of the human.

The biosensor processor 110 is configured to receive, collect and process biosensor 108 signals. In one example, the biosensor processor 110 processes the biosensor signals such that the results of the processing can be used to identify the presence of a live human being. In one example, the biosensor processor 110 is also configured to detect an array of biophysical characteristics of the human, based on the received biosignal from the biosensor 108. In some examples, spurious "noise", including electromagnetic signals not directly emanating from the human being measured may have to be selectively eliminated, for example, using one or more filters. In one example, the biosensor processor 110 may be advantageously disposed within the housing of the headphones of the audio reproduction device 102. Functions and features of the biosensor processor 110 will be further described in detail with reference to FIG. 1A.

The intermediate digital processor 112 may be configured to integrate the information collected from the biosensor processor 110 and apply mathematical algorithms to extract selective intelligence as it relates to the presence, mental state of mind and/or physical condition of the human being measured. In one example, the intermediate digital processor 112 may be advantageously disposed within the housing of the headphones of the audio reproduction device 102. Functions and features of the intermediate digital processor 112 will be further described in detail, with reference to FIG. 1B.

In one example, based on the evaluation of the biosignals received from the biosensor processor 110 by the intermediate digital processor 112, the audio reproduction device 102 may be selectively enabled or disabled. In one example, if a presence of a human being is detected, audio signal from the audio source 104a-104c may be selectively sent or coupled to the audio reproduction device 102. In some examples, a switch circuit may be advantageously used to selectively send or couple the audio signal from the audio source 104a-104c to the audio reproduction device 102. In some examples, the switch may be disposed in the audio source 104a-104c. In some examples, the switch may be disposed in the audio reproduction device.

In one example, the audio signal received from the audio source 104a-104c may be encrypted. The intermediate digital processor 112 may be configured to receive the encrypted audio signal from the audio source 104a-104c. The intermediate digital processor 112 may selectively decrypt the encrypted audio signal. The decrypted audio signal may then be passed on from the intermediate digital processor 112 to the audio reproduction device 102 for reproduction. In one example, the intermediate digital processor 112 may be selectively configured to enable the decryption of the encrypted audio signal, based on the evaluation of the biosignals received from the biosensor processor 110.

In some examples, the system 100 may further include a results processor 114. The results processor 114 may be configured to collect information from the intermediate digital processor 112, and correlate observations with the audio and/or video source. For example, the specific relative time in the audio or visual content at which a certain biophysical change was observed. As one skilled in the art appreciates, in one example, the results processor 114 may be configured to communicate with the intermediate digital processor 112 and the audio source 104a-104c, over the link 106. In some examples, the results processor 114 may be a standalone system. In some examples, the results processor 114 may be incorporated within the audio source 104a-104c.

Figure 1A:
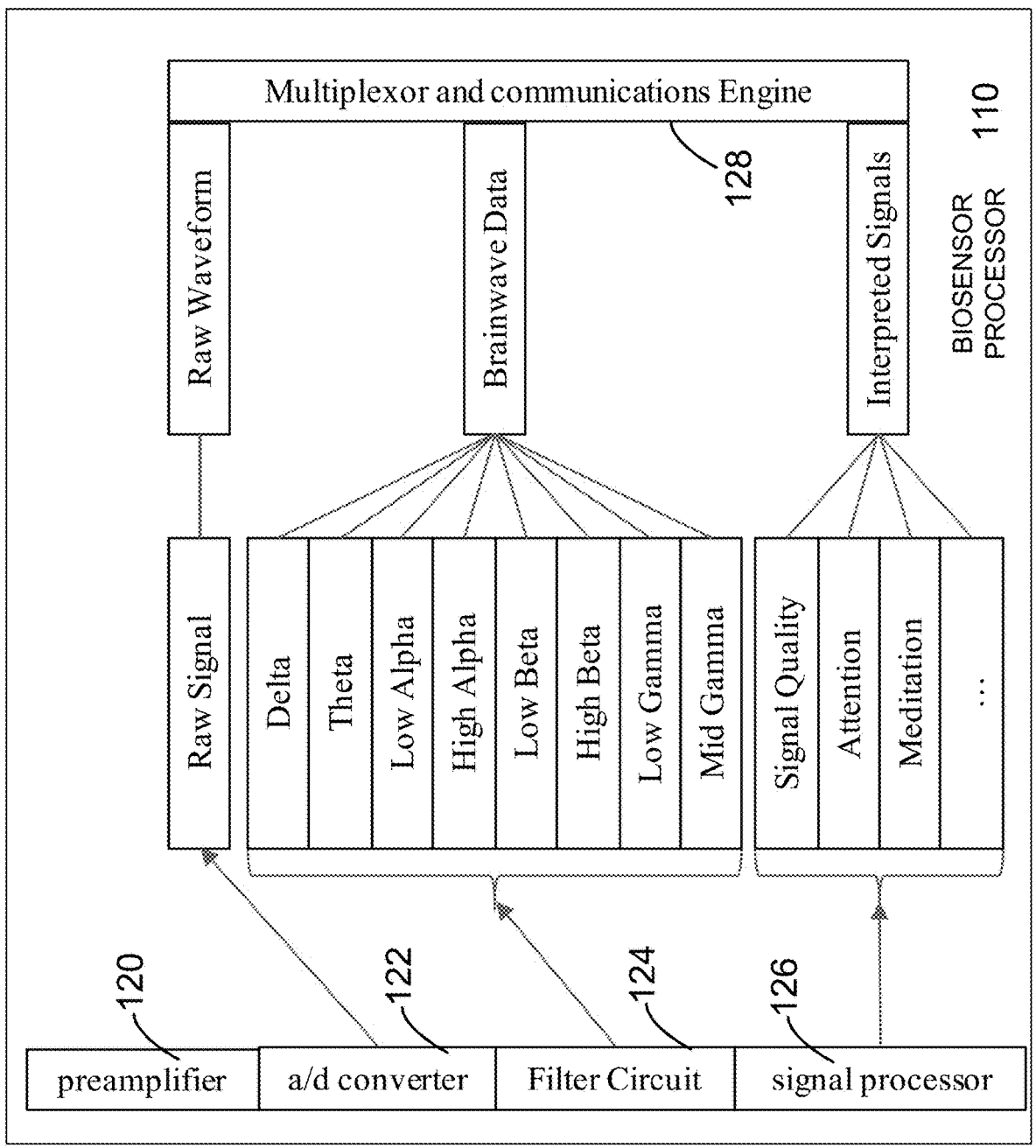
FIG. 1A shows an example biosensor processor, according to one aspect of the present disclosure.

Now, referring to FIG. 1A, the biosignal processor 110 is further described. The biosignal processor 110 includes a preamplifier 120, an analog to digital converter (A/D converter) 122, a filter circuit 124, a signal processor 126 and a multiplexor and communication engine 128. The preamplifier 120 is configured to receive the biosignals from one or more biosensors 108 that are selectively disposed near or over the human utilizing the audio reproduction device 102. As one skilled in the art appreciates, the received biosignal will be in analog form. The preamplifier 120 amplifies the received analog biosignal from the biosensors 108 to generate an amplified biosignal. The amplified biosignal is then fed to the A/D converter 122 to generate a digital biosignal.

In one example, the digital biosignal is passed as raw signal to the intermediate digital processor 112, using the multiplexor and communication engine 128.

In one example, the digital biosignal is passed through the filter circuit 124. The filter circuit 124 selectively filters the digital biosignal based on various frequency bands. For example, the output of the filter circuit 124 may divide the digital biosignal as delta, theta, alpha (low and high), beta (low and high), and gamma (low and mid) frequency bands. These frequency bands will be further described with reference to FIG. 2A. Filtered digital biosignal is passed on to the intermediate digital processor 112, as brainwave data, using the multiplexor and communication engine 128.

In one example, the signal processor 126 receives the output of the filter circuit 124 and processes the received signal to determine various attributes of the received biosignal. For example, based on the composition of signal received, the signal processor 126 may determine or conclude whether a human is present, what type of mood or behavior is likely exhibited by the listener based on the audio signal heard by the listener, and the likes. Various attributes of the biosignal and corresponding correlation between the attributes of the biosignal and the audio signal heard by the listener is further described with reference to FIG. 2B. Interpreted signal by the signal processor 126 is communicated to the intermediate digital processor 112, as interpreted signal data, using the multiplexor and communication engine 128.

Figure 1B:
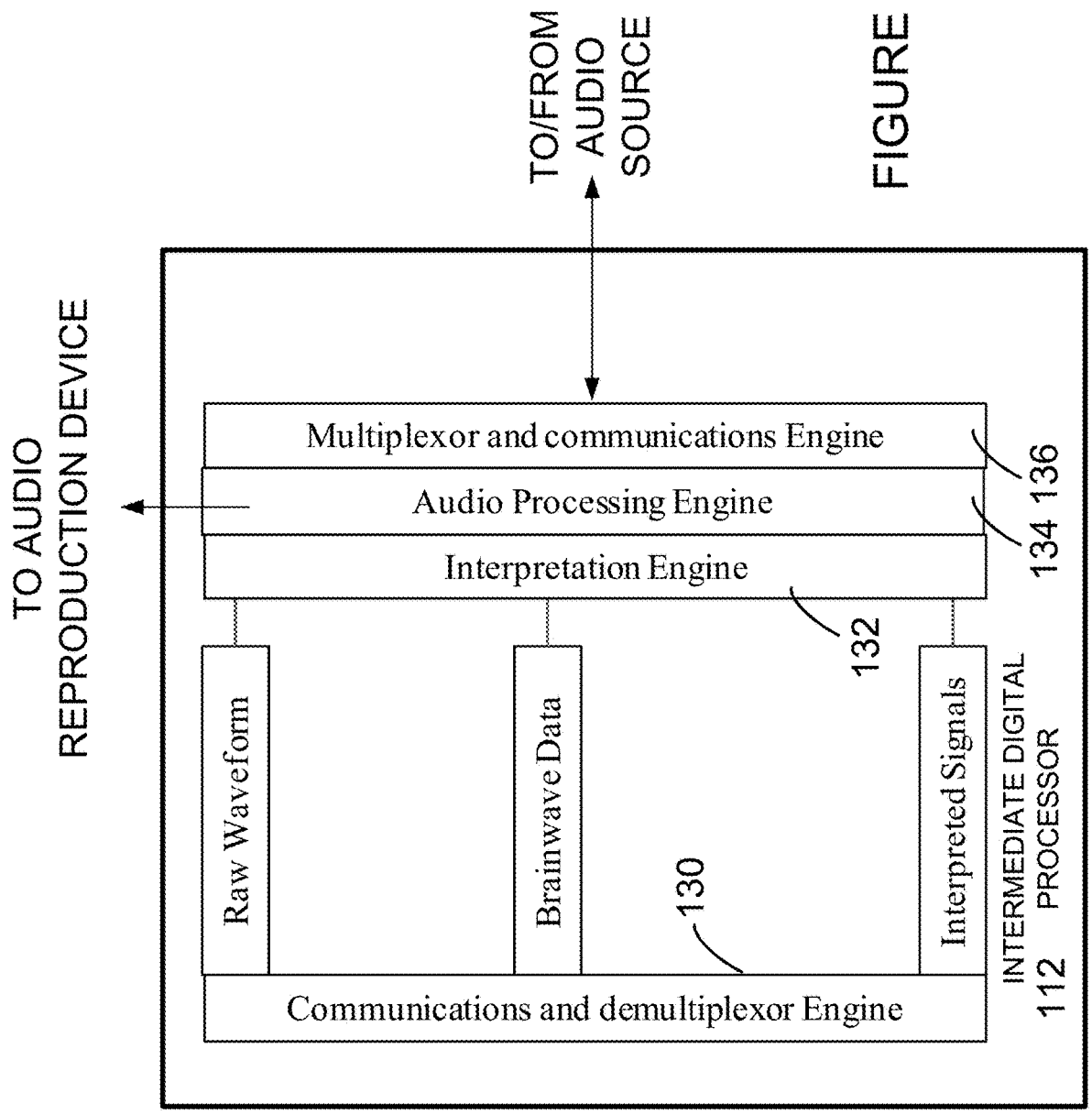
FIG. 1B shows an example intermediate digital processor, according to one aspect of the present disclosure.

Now, referring to FIG. 1B, the intermediate digital processor 112 is described. The intermediate digital processor 112 includes a communication and demultiplexor engine 130, an interpretation engine 132, audio processor engine 134, and an audio multiplexor and communication engine 136. The communication and demultiplexor engine 130 is configured to communicate with the multiplexor and communication engine 128 of the biosensor processor 110.

The interpretation engine 132 is configured to receive raw audio signal, brainwave data and interpreted signals from the biosensor processor 110 and process the received signals. In one example, based on the analysis of the interpreted signals, the interpretation engine 132 may determine that a human is not present and send a signal to the audio processing engine to selectively disable feeding of the audio signal to the headphone. In one example, based on the analysis of the interpreted signals, the interpretation engine 132 may determine that a human is present and send a signal to the audio processing engine to selectively enable feeding of the audio signal to the headphone. In yet another example, the interpretation engine 132 may correlate the brainwave data to a corresponding portion of the audio signal and determine a mood or mood change of the listener. In one example, the audio processing engine 134 may be configured to selectively decrypt an encrypted audio signal received from the audio source, before feeding the audio signal to the headphone.

Some example systems may include a colored light or set of lights located on the audio reproduction device. The color or intensity of the light can represent specific mental conditions or states of mind, which may be advantageously used to alert others to future pending actions or feelings.

In one example, the system may utilize a unique identifier associated or incorporated within the audio reproduction device. The unique identifier or key allows a provider of digital content (for example, audio content) to encode or encrypt specific content in such a way that it can only be reproduced by audio reproduction device that is incorporated in the audio reproduction device.

The audio multiplexor and communication engine 136 is configured to communicate with the audio processing engine 134 and the audio source.

Now, referring to FIG. 2A, table 200 is described. Table 200 shows various brainwave types in column 202, corresponding frequency spectrum in column 204 and typical amplitude range in column 206. For example, referring to row 208, we notice that brainwave type "DELTA" has a frequency spectrum of 0.1-0.3 Hz, with an amplitude range of about 100-200 microvolts. In some examples, some of the brainwave types may be further subdivided as "low", "medium" and "high" based on a sub-frequency spectrum within the frequency spectrum.

Figure 2B:
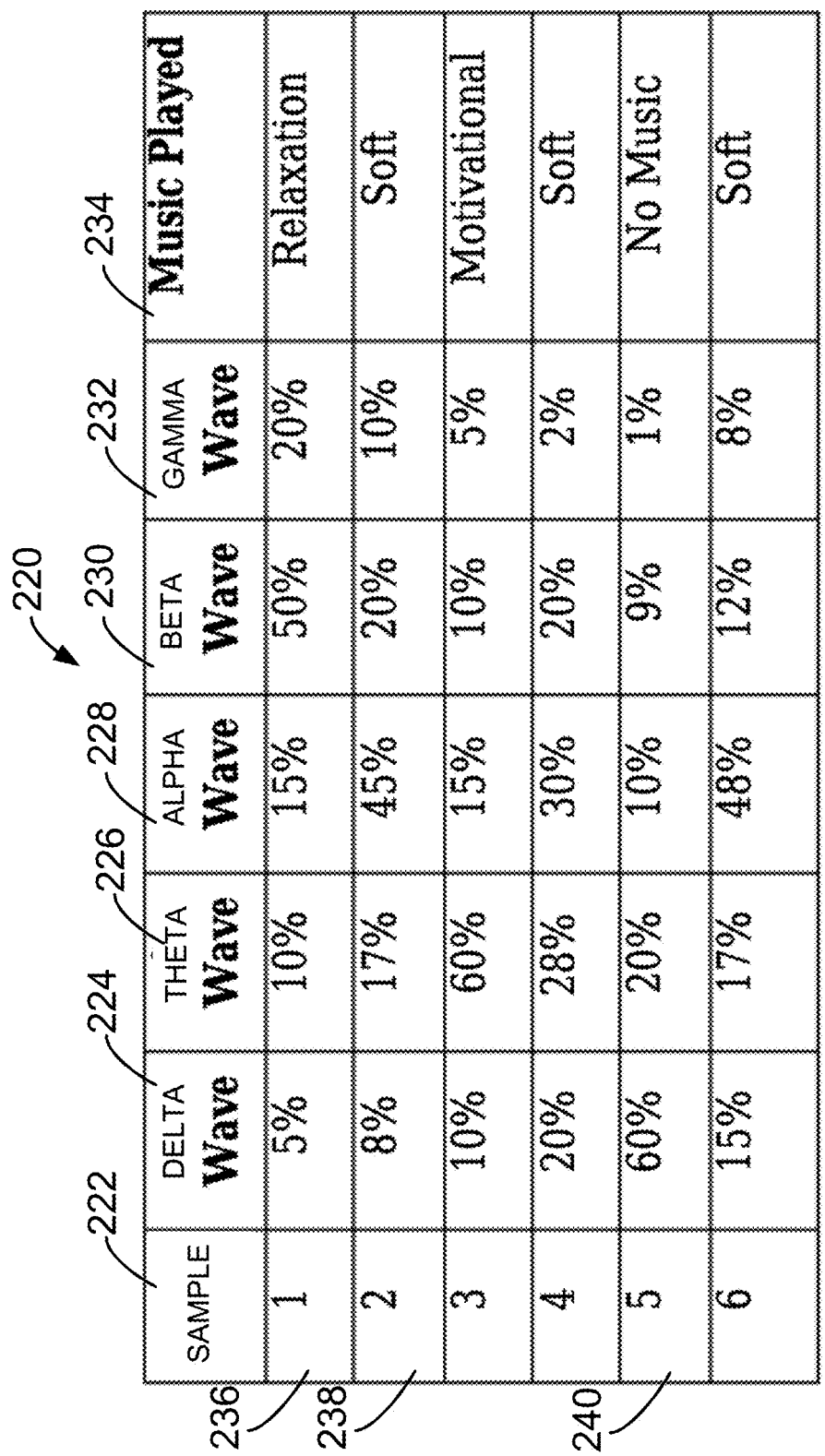
FIG. 2B shows an example table showing relative spectral densities of brainwave, while listening to different music styles, according to one aspect of the present disclosure.

Now, referring to FIG. 2B, table 220 shows various music samples with relative spectral density of brainwaves, based on the type of music played. For example, column 222 shows various samples, columns 224-232 shows relative spectral densities of the brainwaves and column 234 shows type of music played. For example, referring to row 236, we notice that a music that is intended to relax a listener shows a higher beta wave spectral density (50%). Similarly, referring to row 238, we notice that a music that is considered a soft music shows a high alpha wave spectral density (45%). Similarly, referring to row 240, when no music is played, a higher delta wave spectral density (60%) is observed. As one skilled in the art appreciates, by measuring the spectral density of various brainwaves and the relative difference between them, the system can determine if a human head is present, and whether a specific type of music or visual content is having a specific biophysical effect on the listener and the likes.

Figure 3A:
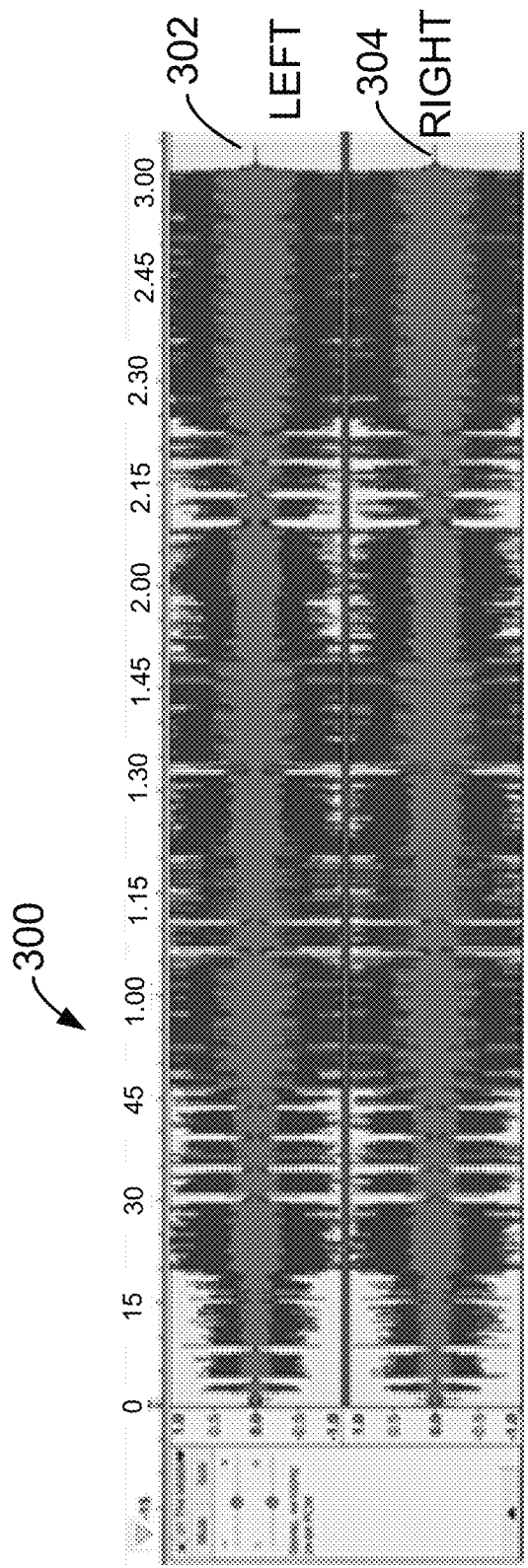
FIG. 3A shows an example chart showing an audio signal of a sample music, according an aspect of the present disclosure.
Figure 3B:
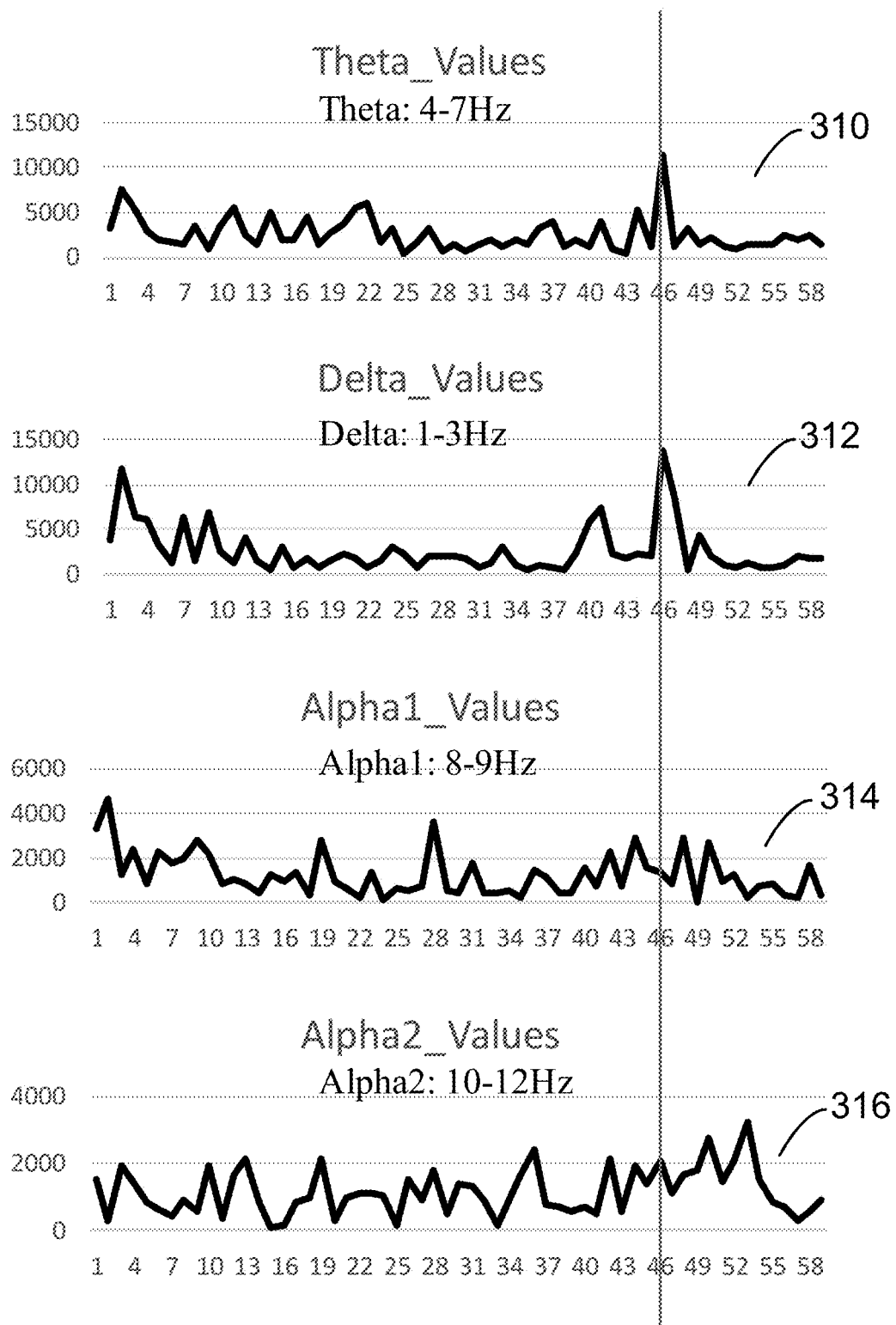
FIGS. 3B and 3C shows various brainwave signals recorded from a listener, while listening to a portion of the audio signal of the sample music of FIG. 3A, according to an aspect of the present disclosure.
Figure 3C:
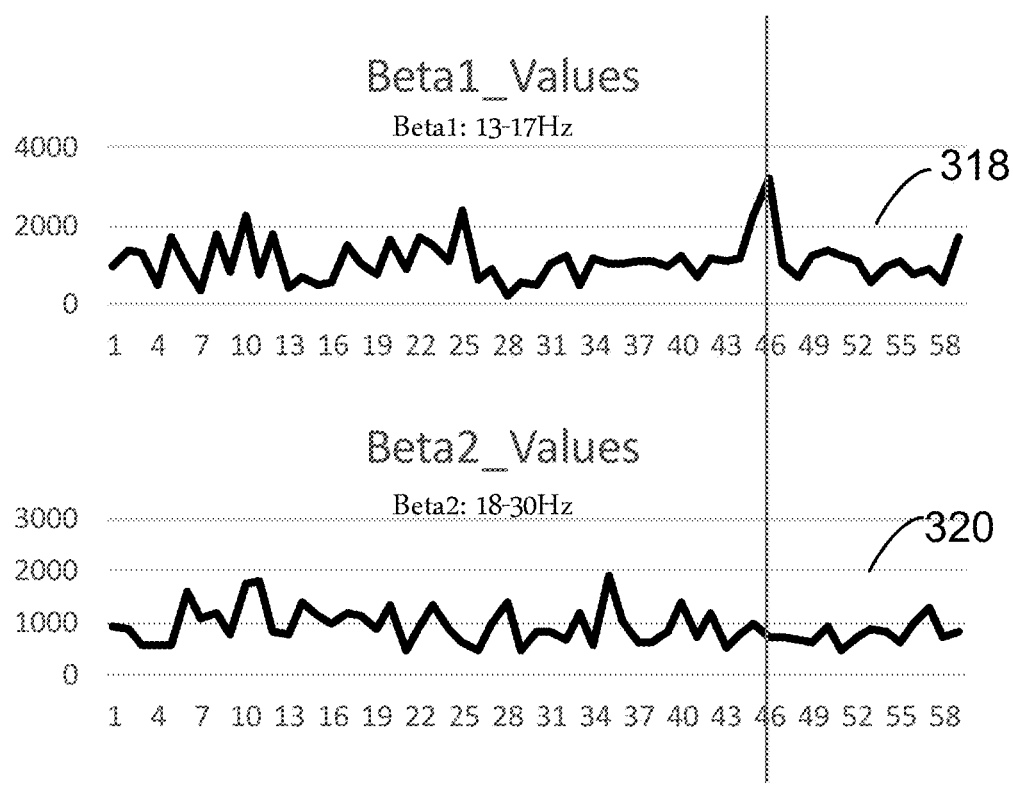

Now, referring to FIG. 3A, an example chart shows an audio signal of a sample music 300. In this example, the sample music 300 has two channels, left and right. Graph 302 shows the left channel audio of the sample music 300 over time. Graph 304 shows the right channel audio of the sample music 300 over time. The sample music 300 is about 3 minutes in length. In one example, the sample music 300 is played over the headphone of the listener and corresponding biosignals are measured, as previously described. FIGS. 3B and 3C show various brainwave signals measured for about first 60 seconds of the sample music 300 shown in FIG. 3A.

Now, referring to FIGS. 3B and 3C, graph 310 shows the theta values, graph 312 shows delta values, graph 314 shows alpha (low) values (8-9 Hz range), graph 316 shows alpha (high) values (10-12 Hz range), graph 318 shows beta (low) values (13-17 Hz), and graph 320 shows beta (high) values (18-30 Hz). While observing various graphs in FIGS. 3B and 3C, we notice that there was a spike in some of the brainwaves around time 46 seconds. For example, graph 310, 312 and 318. This is further explained with reference to FIG. 3D.

Figure 3D:
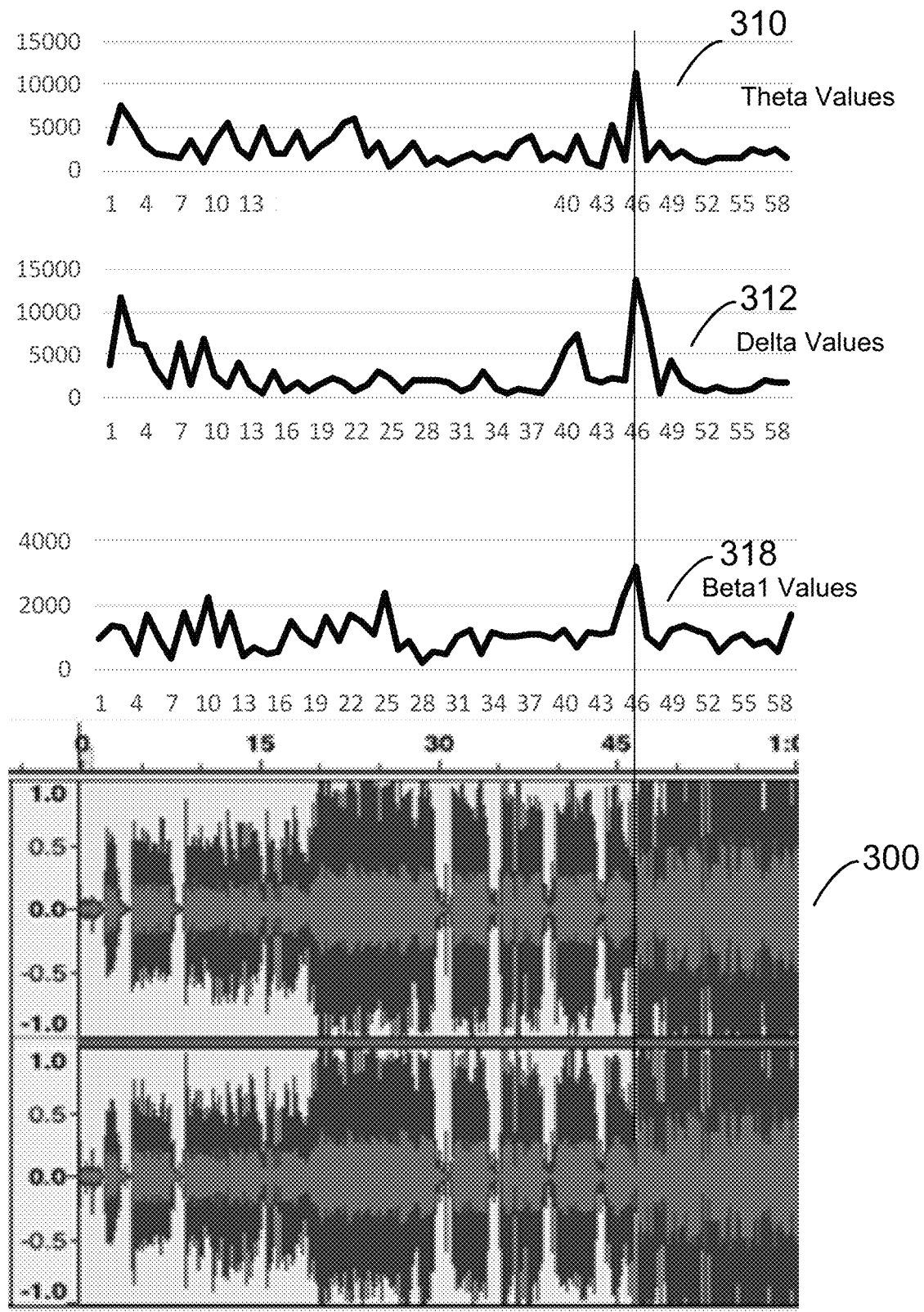
FIG. 3D shows selective brainwave signals associated with selective portion of the audio signal of the sample music of FIG. 3A, according to an aspect of the present disclosure.

Now, referring to FIG. 3D, the graph 310, 312 and 318 are compared to corresponding portion of the sample music 300. We notice that around time stamp of about 46 seconds, there was a measurable change in the brainwave activity of the listener. By evaluating the portion of the sample music 300 that resulted in an elevated brainwave activity in some of the frequency spectrum, a profile or preference for the listener may be developed.

Figure 4:
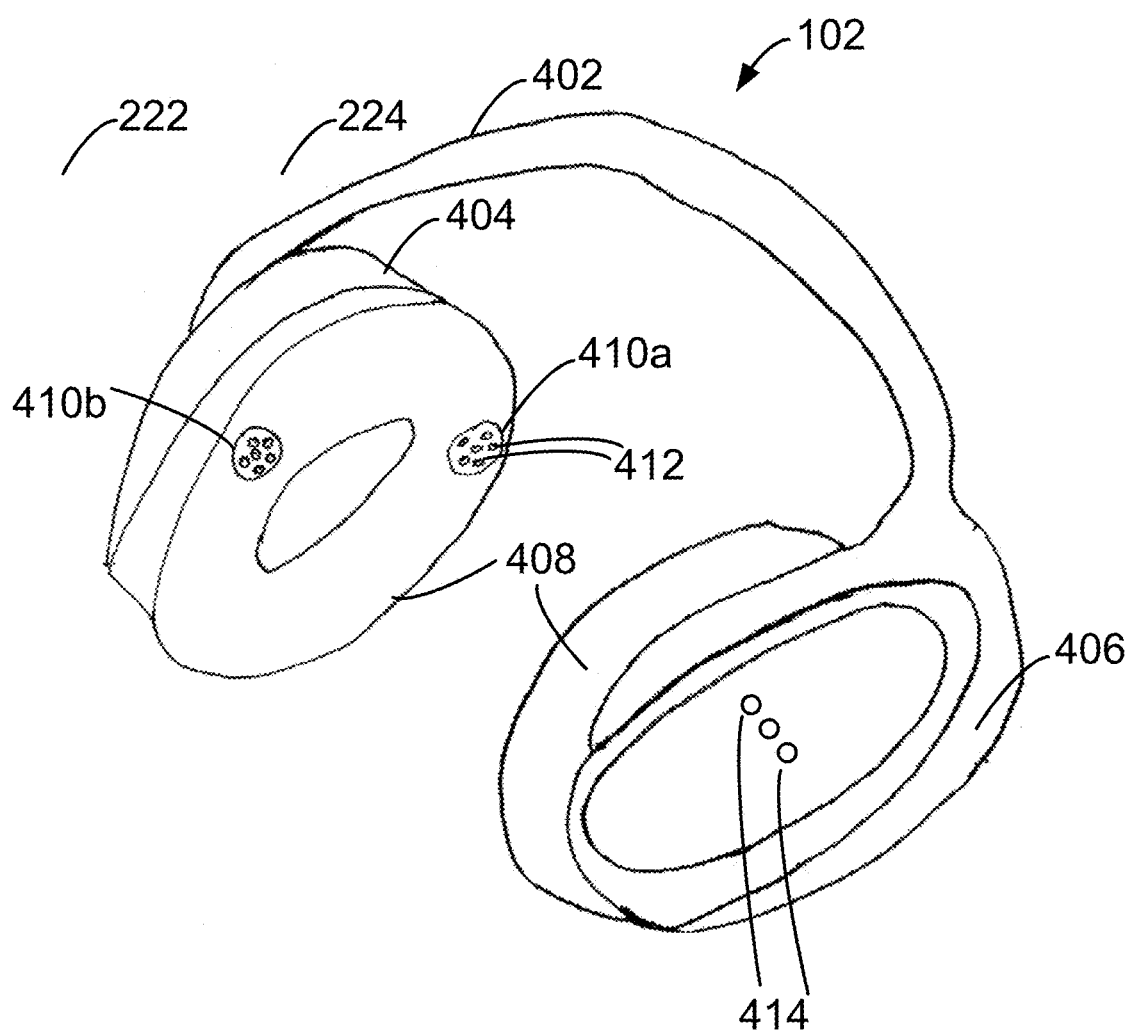
FIG. 4 shows an example headphone, with sensors, according to an aspect of the present disclosure.

Now, referring to FIG. 4, an example audio reproduction device 102 is described. The audio reproduction device 102 includes a head band 402, a left ear driver 404 and a right ear driver 406. The left ear driver 404 and the right ear driver 406 are surrounded by a ear cushion 408. In one example, two sets of sensors 410a and 410b project through the ear cushion 408. The sensors 410a and 410b are selectively placed in the ear cushion 408 so as to make selective contact with a listener's head. The sensors 410a and 410b have a plurality of sense probes 412 that are configured to make selective contact with a listener's head. For example, the sense probes 412 of the sensor 410a is selectively positioned to touch temple area of the listener's head. The sense probes 412 of the sensor 410b are selectively positioned to touch mastoid area of the listener's head. In one example, the audio reproduction device 102 may include a plurality of indicators 414. The plurality of indicators may be lights with one or more colors, which may be selectively activated to indicate a certain mood expressed by the listener, based on the analysis of the biosignal, as previously described. The plurality of indicators 414 may be disposed on the enclosure of the left ear driver 404 and/or the enclosure of the right ear driver 406. In some examples, the plurality of indicators 414 may be disposed on the head band 402.

In some examples, the sensors 410a and 410b may be disposed on the surface of the ear cushion. In some examples, the sensors 410a and 410b may be disposed within the ear cushion and configured to sense the biosignal through the ear cushion.

Figure 5:
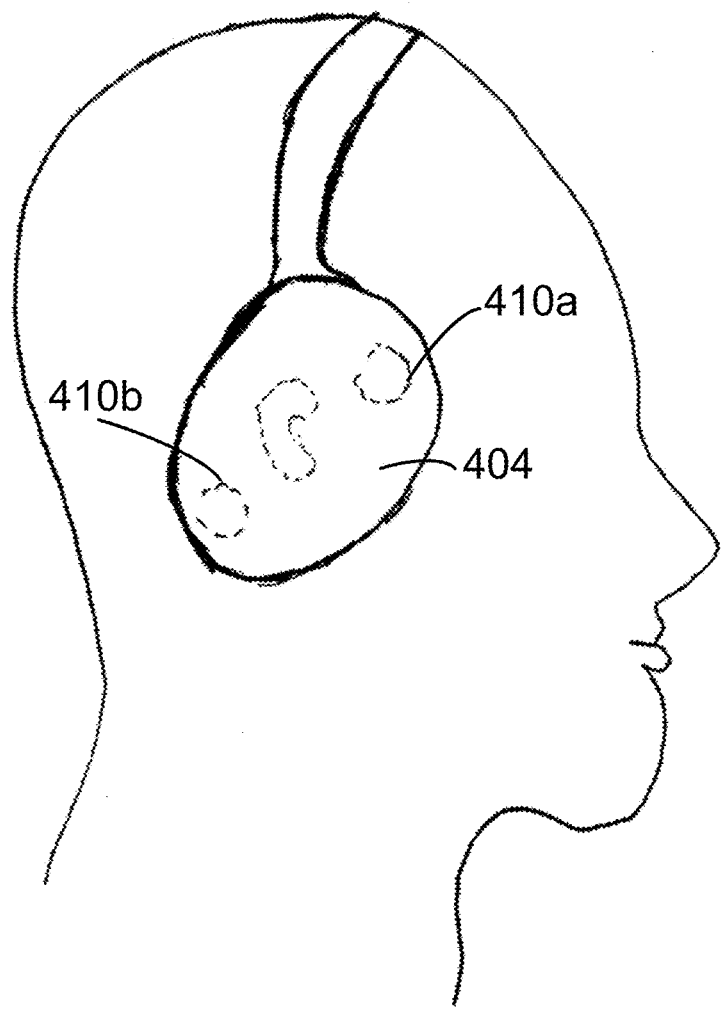
FIG. 5 shows the headphone of FIG. 4 selectively placed around a head of the listener, according to an aspect of the present disclosure.

Now, referring to FIG. 5, selective placement of the audio reproduction device 102 around a listener's head is described. The left ear driver 404 is positioned around the listener's left ear 502, such that the sensor 410a is positioned to touch temple area of the listener's head. And, the sensor 410b is positioned to touch the mastoid area of the listener's head.

As one skilled in the art appreciates, although the sensors are described with reference to the left ear driver 404, in some examples, the sensors may be disposed on the ear cushion 408 of the right ear driver 406. In some examples, the sensors may be present on the ear cushion 408 of both the left ear driver 404 and right ear driver 406.

Figure 6:
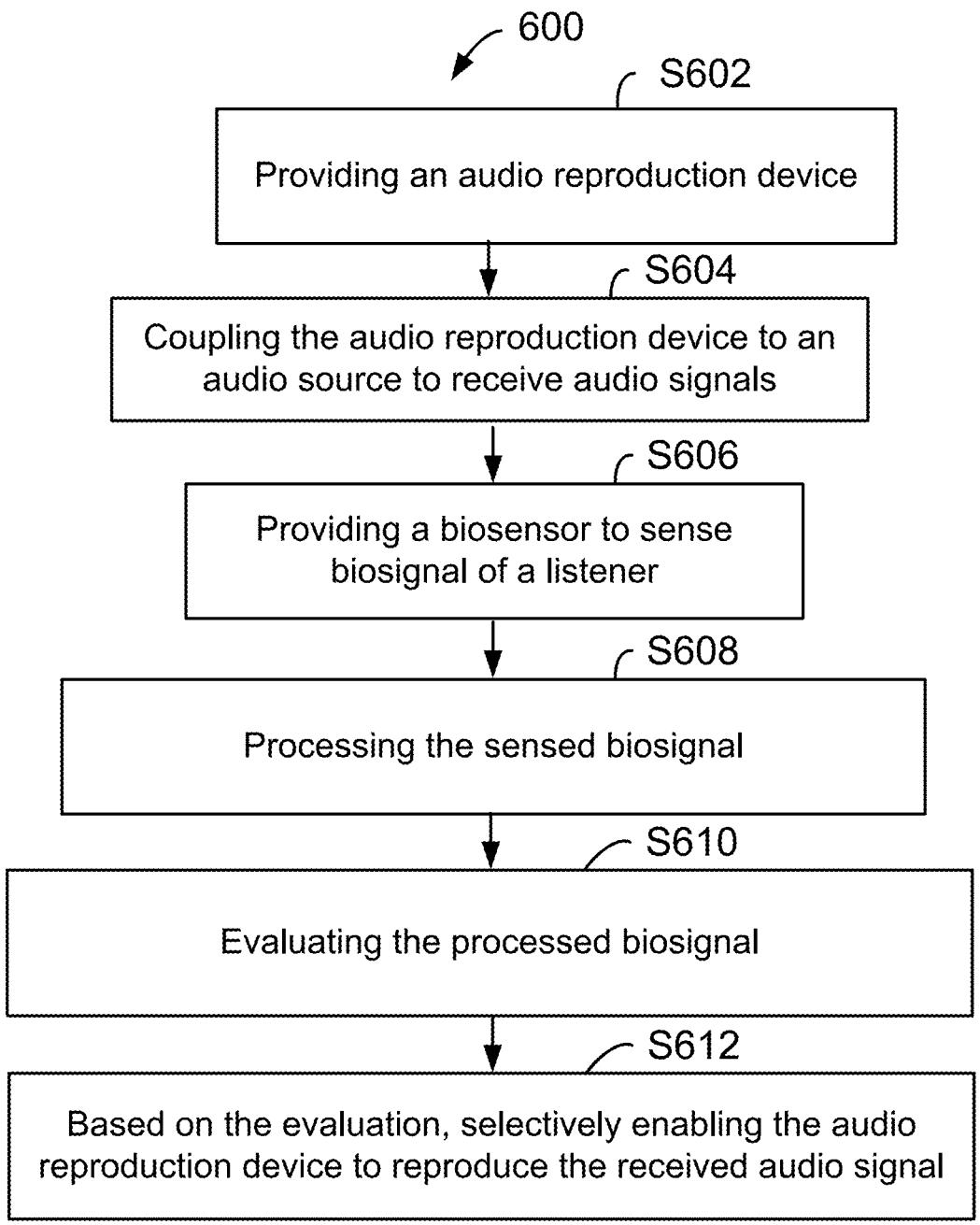
FIG. 6 shows an example flow diagram to reproduce audio signals in an audio reproduction device, according to an aspect of the present disclosure.

Now, referring to FIG. 6, an example flow diagram 600 is described. In block S602, an audio reproduction device is provided. For example, audio reproduction device 102 as previously described is provided.

In block S604, the audio reproduction device is coupled to an audio source to receive audio signal. In block S606, a biosensor is provided to sense biosignal of a listener. For example, biosensor as previously described with reference to FIG. 1 and FIG. 4 is used to sense biosignal of a listener.

In block S608, sensed biosignal are processed. For example, sensed biosignal is processed as previously described with reference to FIGS. 1, 1A and 1B. In block S610 the processed biosignal is evaluated. In one example, the processed biosignal is evaluated for the presence of a human head. In block S612, based on the evaluation of the processed biosignal, the audio reproduction device is selectively enabled to reproduce the received audio signal. For example, as previously described, intermediate digital processor 112 selectively enables the audio reproduction device to reproduce the received audio signal.

Processors described in this disclosure may include arithmetic and logic units. In some examples, processors may include memory to store transient and permanent data. As one skilled in the art appreciates, various modules or system blocks referenced in this disclosure may be implemented in hardware, software executed on a computing device or a combination of hardware and software. Additionally, various modules or system blocks may be implemented as an integrated unit or may be implemented as separate functional units that interact with each other using a communication protocol. The algorithms, code, modules, system blocks or transient or permanent data may be modified, updated and/or upgraded via wired or wireless digital connection 106.

Example application 1: Often a talent will use a headphone (or an audio reproduction device) in a recording studio or sound stage to monitor audio while they are speaking, singing or playing a musical instrument as it is being recorded. A common problem is that the talent may forget to disconnect or mute their headphone after removing it. A subsequent recording session may therefore be ruined due to spurious sound "bleeding" from the unused headphone which was not disconnected or muted. This disclosure describes the integration of a biosensor (or set of biosensors) within the headphone device itself, such that if the headphone does not sense the presence of a live human, it automatically stops the sound emanating from the headphone device. If a human is subsequently definitively sensed, the headphone re-enables the sound.

Example application 2: Theft of digital media content is a significant threat to the entertainment industry. Numerous methods may be employed to encrypt or obfuscate the content, however prior to its consumption by a human being, the audio content must be decrypted and presented in a clear analog form. This presents a potential vulnerability, in that the headphone (or audio reproduction devices) used to decrypt the content could be placed on a device which simulates the size and shape of a human head, with microphones in place of the ears. In this case the audio content could be recorded and reproduced with high quality, using the microphones, circumventing attempts to block copying of the content. This disclosure requires the presence of an actual live human head to enable the headphone to reproduce audio. Without the presence of a live human head, as measured by the presence of biological activity by the biosensors, no sound is produced.

Example application 3: As a person listens to music or observes visual material, it may be valuable to determine his or her level of engagement with the material as it plays. One potential application is for the producer or distributor of the audio and or visual content to measure whether the listener is emotionally moved as the content creator intended. For example, does a particular phrase which occurs at a particular time within a recorded song induce excitement, calm, interest, disinterest, etc. Furthermore, does a particular scene in a motion picture evoke specific mental or emotional reactions as intended by the screenwriter? This disclosure enables the measurement of biophysical reactions in real-time, as the music or motion picture is enjoyed by a live human being.

Example application 4: As a person exercises while listening to music, it may be valuable to maximize the effect of the exercise by correlating particular musical characteristics with the level of exertion of the person exercising. This disclosure enables correlating bioinformation associated with the effectiveness of the person's physical activity with the audio or visual content present during the exercise.

Example application 5: People, including people with mental disorders, interpret different styles of music in different ways. Some music is soothing and has a calming effect; other music may stimulate critical thinking, thus enhancing the listener's ability to concentrate and apply logic. As music is heard, bioinformation may be used to automatically distinguish the emotion and physical reaction to the music in real-time.

Some example systems may require physical action on the part of the listener to select "thumbs-up" or "thumbs-down" to identify desired versus undesired musical styles or artists, this disclosure enables the real-time detection of the live human's reaction to the music without requiring physical action. As a consequence, the Results Processor may be configured to automatically generate various "playlists" of desired music as determined by biophysical response. A "Calming" playlist can direct songs of a particular style to the listener that have been shown through individual biosensor measurements to evoke the desired emotional effect. Alternatively, a "Workout" playlist can direct songs to the listener of a style that the biosensor measurements show evoke an energetic response.

Example application 6: People, including people with mental disorders, express certain biosignals that indicate their state of mind, or may indicate the state of a specific mental disorder. Their state of mind may be caused by audio they are hearing, or images they are seeing. Sensed bioinformation may be used to automatically distinguish the emotion and physical reaction to stimuli that are being sensed. This information can then be used to activate digital, audio or visual indicators to notify themselves or others as to their biophysical state. Some example systems may include a colored light or set of lights located on the headphone system. The color or intensity of the light can represent specific mental conditions or states of mind, alerting others to future pending actions or feelings.

Example application 7: There is value in encrypting or obfuscating content such that its consumption can be controlled and limited to specific audio reproduction devices. One potential application includes encrypting or otherwise obfuscating the digital content such that the content is rendered useable by a decryption algorithm integrated within the disclosed audio reproduction device. This protects the content from unauthorized reproduction, unless the decryption algorithm situated within the audio reproduction device described in the current disclosure is present, and a specific key or keys are available to render the content useable.

Following are some of the advantages of the current disclosure. By detecting bio signals associated with a live human being, it is impossible to circumvent the measurement by using a "fake head". Since human bio signals are required to be present, versus tilt or physical location, there are no restrictions related to the physical positioning of the person utilizing the audio reproduction device. By detecting actual brainwave activity, it is possible to create correlations between the content of the audio or visual content, and the emotional and physical reactions evoked by the content to the listener. Further, by restricting consumption of the digital content to specific audio reproduction devices, content owners or distributers can deliver differentiated content to specific users.

Following are some of the possible variations to the disclosure disclosed herein. Multiple physical contacts may be provided for the biosensors. For example, a plurality of electrical contacts touching the human's skin, at the cheek, around the ear, on the forehead, or on the scalp.

Non-contact sensors may be used. Sensors may be placed near the human head, including but not limited to within the headband of the headphone, capable of detecting bio signals without physical contact to the human's skin.

The biosensor processor 110 and intermediate digital processor 112 may be physically integrated into the headphone device, or reside externally in a separate device such as a laptop computer, a smartphone, or a custom device. In some examples, functions and features of the biosensor processor 110 and intermediate digital processor 112 may be combined into a single processor.

The audio reproduction device may be worn around the ears, on the ears, or within the ear canal of the listener. In some examples, the audio reproduction device may operate in conjunction with a video display device, for example, to present an audio-visual presentation. The audio-visual presentation may be a movie, a concert, a game and the like. In some example, the video display device may be integral with the audio reproduction device. In some examples, the video display device may be separate from the audio reproduction device. When a listener uses both the audio reproduction device and the video display device, the biosignal sensed by the audio reproduction device of this disclosure may be based on a reaction to both audio signals and video signals.

The audio reproduction device may contain unique serial number or numbers, and/or unique key or keys. The keys may be securely updated via wired or wireless connection, such that reproduction of specific content by each audio reproduction device may be enabled or disabled. Further, a unique serial number or identifier may be permanently incorporated within the audio reproduction device. This identifier may be utilized in various ways, including restricting some content to specific audio reproduction devices, or determining authenticity of the audio reproduction device to ensure that it is not a copy or unauthorized reproduction.

The embodiments disclosed herein can be implemented through at least one software program running on at least one hardware device and performing various functions of the security appliance. Various functions of the audio reproduction device as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for selectively activating an audio reproduction device, including:
   providing the audio reproduction device;
   coupling the audio reproduction device to an audio source to receive audio signal;
   providing a biosensor to sense biosignal of a listener, the sensed biosignal indicative of a brainwave data of the listener,
      wherein, the audio reproduction device further including a ear cushion to selectively surround an ear of the listener, and the biosensor is disposed about the ear cushion;
      wherein, the biosensor includes a plurality of sense probes, wherein the plurality of sense probes project through the ear cushion to selectively contact a portion of the listener;
   processing the sensed biosignal indicative of the brainwave data of the listener by a biosensor processor disposed in the audio reproduction device;
   evaluating the processed biosignal indicative of the brainwave data of the listener by an intermediate digital processor disposed in the audio reproduction device;
   determining a presence of a live human being based on the evaluation of a spectral density of the sensed biosignal indicative of the brainwave data of the listener, by the intermediate digital processor disposed in the audio reproduction device; and
   based on the determination of the presence of the live human being based on the evaluation of the spectral density of the sensed biosignal indicative of the brainwave data of the listener, by the intermediate digital processor disposed in the audio reproduction device, selectively enabling the audio reproduction device by the intermediate digital processor disposed in the audio reproduction device to reproduce the received audio signal to the listener.

2. The method of claim 1, wherein the audio signal is encrypted and the intermediate digital processor is configured to selectively decrypt the encrypted audio signal, based on the determination.

3. The method of claim 1, further including, correlating the evaluation of the biosignal indicative of a brainwave data of the listener with corresponding audio signal, by a results processor, to determine an effect of the audio signal to the listener of the audio signal.

4. The method of claim 1, wherein audio reproduction device includes an identifier, determining whether the audio reproduction device is authorized to receive the audio signal based on the identifier, and permitting the audio reproduction device to reproduce the audio signal when the audio reproduction device is authorized based on the identifier.

5. The method of claim 1, wherein a subset of the plurality of sense probes contact a temple area of the listener and another subset of the plurality of sense probes contact a mastoid area of the listener.

6. The method of claim 1, wherein a plurality of indicators are disposed about the audio reproduction device, wherein the plurality of indicators are selectively energized to indicate a mood of the listener, based on the sensed biosignals.

7. The method of claim 1, wherein the audio signal corresponds to an audio portion of an audio-visual presentation presented to the listener and the sensed biosignal is due to a combination of the audio and visual presentation presented to the listener.

8. The method of claim 1, wherein the biosignal indicative of the brainwave data of the listener is an analog signal.

9. The method of claim 1, wherein a significant portion of delta waves in the spectral density of the brain wave data is indicative of the presence of a live human being, when no music is being played.

10. The method of claim 9, wherein the delta waves constitute about 60% of the spectral density of the brain wave data.

11. A system to selectively activate an audio reproduction device, including:
an audio source, the audio reproduction device coupled to the audio source to receive audio signal;
a biosensor to sense biosignal of a listener, the sensed biosignal indicative of a brainwave data of the listener, wherein, the audio reproduction device further including a ear cushion to selectively surround an ear of the listener, and the biosensor is disposed about the ear cushion;
wherein, the biosensor includes a plurality of sense probes, wherein the plurality of sense probes project through the ear cushion to selectively contact a portion of the listener;
a biosensor processor configured to process the sensed biosignal indicative of the brainwave data of the listener, the biosensor processor disposed in the audio reproduction device;
an intermediate digital processor configured to evaluate the processed biosignal indicative of the brainwave data of the listener, the intermediate digital processor disposed in the audio reproduction device;
determine a presence of a live human being based on the evaluation of a spectral density of the sensed biosignal indicative of the brainwave data of the listener, by the intermediate digital processor disposed in the audio reproduction device; and
based on the determination of the presence of a live human being based on the evaluation of the spectral density of the brainwave data by the intermediate digital processor disposed in the audio reproduction device, the intermediate digital processor disposed in the audio reproduction device selectively enables the audio reproduction device to reproduce the received audio signal to the listener.

12. The system of claim 11, wherein the audio signal is encrypted and the intermediate digital processor is configured to selectively decrypt the encrypted audio signal, based on the determination.

13. The system of claim 11, further including, correlating the evaluation of the biosignal indicative of a brainwave data of the listener with corresponding audio signal, by a results processor, to determine an effect of the audio signal to the listener of the audio signal.

14. The system of claim 11, wherein audio reproduction device includes an identifier, determines whether the audio reproduction device is authorized to receive the audio signal based on the identifier, and permits the audio reproduction device to reproduce the audio signal when the audio reproduction device is authorized based on the identifier.

15. The system of claim 11, wherein a subset of the plurality of sense probes contact a temple area of the listener and another subset of the plurality of sense probes contact a mastoid area of the listener.

16. The system of claim 11, wherein a plurality of indicators are disposed about the audio reproduction device, wherein the plurality of indicators are selectively energized to indicate a mood of the listener, based on the sensed biosignals.

17. The system of claim 11, wherein the audio signal corresponds to an audio portion of an audio-visual presentation presented to the listener and the sensed biosignal is due to a combination of the audio and visual presentation presented to the listener.

18. The system of claim 11, wherein the biosignal indicative of the brainwave data of the listener is an analog signal.

19. The system of claim 11, wherein a significant portion of delta waves in the spectral density of the brain wave data is indicative of the presence of a live human being, when no music is being played.

20. The system of claim 19, wherein the delta waves constitute about 60% of the spectral density of the brain wave data.

* * * * *